US008880725B2

(12) United States Patent
Ananthanarayanan et al.

(10) Patent No.: US 8,880,725 B2
(45) Date of Patent: Nov. 4, 2014

(54) CONTINUOUS REPLICATION FOR SESSION INITIATION PROTOCOL BASED COMMUNICATION SYSTEMS

(75) Inventors: Krishnan Ananthanarayanan, Redmond, WA (US); Sankaran Narayanan, Redmond, WA (US); Dhigha Sekaran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 12/787,534

(22) Filed: May 26, 2010

(65) Prior Publication Data

US 2011/0295957 A1    Dec. 1, 2011

(51) Int. Cl.
G06F 15/173    (2006.01)
H04L 29/08    (2006.01)

(52) U.S. Cl.
CPC ............ *H04L 67/1095* (2013.01); *H04L 67/24* (2013.01)
USPC .......................................... 709/238; 709/241

(58) Field of Classification Search
None
See application file for complete search history.

(56) References Cited

U.S. PATENT DOCUMENTS

| 6,701,345 | B1 * | 3/2004 | Carley et al. .................. 709/205 |
| 7,007,048 | B1 | 2/2006 | Murray et al. |
| 7,231,502 | B2 | 6/2007 | Lam et al. |
| 7,369,912 | B2 * | 5/2008 | Sherriff et al. ................ 700/100 |
| 7,467,198 | B2 * | 12/2008 | Goodman et al. ............ 709/223 |
| 7,634,679 | B2 | 12/2009 | Quintiliano |
| 7,676,548 | B2 * | 3/2010 | Oh et al. ....................... 709/208 |
| 7,929,562 | B2 * | 4/2011 | Petrovykh .................... 370/429 |
| 2002/0064149 | A1 * | 5/2002 | Elliott et al. .................. 370/352 |
| 2003/0231647 | A1 * | 12/2003 | Petrovykh .................... 370/429 |
| 2005/0141688 | A1 * | 6/2005 | Wengrovitz ............. 379/207.02 |
| 2005/0228865 | A1 * | 10/2005 | Hirsch ......................... 709/206 |
| 2006/0059253 | A1 * | 3/2006 | Goodman et al. ............ 709/223 |
| 2006/0101097 | A1 | 5/2006 | Barboi et al. |
| 2006/0288099 | A1 * | 12/2006 | Jefferson et al. .............. 709/224 |
| 2007/0124380 | A1 * | 5/2007 | Carr et al. .................... 709/204 |
| 2007/0168548 | A1 * | 7/2007 | Atogi et al. .................. 709/238 |
| 2007/0220302 | A1 | 9/2007 | Cline et al. |
| 2007/0276920 | A1 * | 11/2007 | Buchmann et al. .......... 709/217 |
| 2008/0043976 | A1 * | 2/2008 | Maximo et al. ......... 379/220.01 |
| 2008/0133708 | A1 * | 6/2008 | Alvarado et al. ............. 709/218 |
| 2008/0159515 | A1 * | 7/2008 | Rines ....................... 379/221.08 |
| 2008/0171549 | A1 * | 7/2008 | Hursey et al. ................. 455/445 |
| 2009/0063584 | A1 * | 3/2009 | Abzarian et al. ............. 707/203 |
| 2009/0187919 | A1 * | 7/2009 | Maes ............................ 719/313 |
| 2009/0198899 | A1 * | 8/2009 | Revanuru ..................... 711/128 |

(Continued)

OTHER PUBLICATIONS

"Updatable Subscriptions for Transactional Replication", Retrieved at << http://msdn.microsoft.com/en-us/library/ms151718.aspx >>, Nov. 2009, pp. 1-4.

(Continued)

*Primary Examiner* — Ninos Donabed
(74) *Attorney, Agent, or Firm* — Andrew Smith; Jim Ross; Micky Minhas (57) ABSTRACT

User defined routing rules are managed within a primary/backup architecture through continuous replication between home servers and their corresponding presence servers in an automatic manner. User set-up rules are stored and published by a designated presence server to home servers on which the user can register including the user's home registrar and any backup registrars. Changes to the rules may be disseminated and synchronized through comparison of versions and exchange of batches between the presence server and registrars.

19 Claims, 8 Drawing Sheets

(56) References Cited

U.S. PATENT DOCUMENTS

| | | | |
|---|---|---|---|
| 2009/0327519 A1 | 12/2009 | Thiel et al. | |
| 2010/0020728 A1* | 1/2010 | Jefferson et al. | 370/260 |
| 2010/0099418 A1* | 4/2010 | Holley et al. | 455/445 |
| 2010/0125557 A1* | 5/2010 | Wang et al. | 707/690 |
| 2010/0131584 A1* | 5/2010 | Johnson | 709/203 |
| 2010/0169712 A1* | 7/2010 | Argue et al. | 714/25 |
| 2010/0169713 A1* | 7/2010 | Argue et al. | 714/25 |
| 2010/0217837 A1* | 8/2010 | Ansari et al. | 709/218 |
| 2011/0035443 A1* | 2/2011 | Jensen | 709/204 |
| 2011/0096788 A1* | 4/2011 | Ballard et al. | 370/401 |
| 2011/0161335 A1* | 6/2011 | Dash et al. | 707/758 |

OTHER PUBLICATIONS

"Netscape Directory Server for Hp-ux", Retrieved at << http://h20338.www2.hp.com/hpux11i/downloads/netscape_directory_server.pdf >>, pp. 4.

"Cisco Unified Presence 7.0", Retrieved at << http://www.cisco_com/en/US/prod/collateral/voicesw/ps6788/vcallcon/ps6837/data_sheet_c78-483318.html >>, Retrieved Date: Mar. 26, 2010, pp. 1-8.

"Features of Exchange Server 2007", Retrieved at << http://www.microsoft.com/exchange/2010/en/us/exchange-2007-features.aspx >>, Retrieved Date: Mar. 26, 2010, pp. 1-9.

* cited by examiner

CONTINUOUS REPLICATION FOR SESSION INITIATION PROTOCOL BASED COMMUNICATION SYSTEMS

BACKGROUND

Primary/backup failover/failback models are used by conventional server based systems to assign resources to clusters, where typically a standby backup cluster takes over from the primary cluster if the primary cluster becomes unavailable. While reliability is a key requirement for any server based system, minimizing degradation of user experience in the event of a failure means tightly controlled downtime in Session Initiation Protocol (SIP) based communication systems that facilitate real time communications such as audio or video communications.

In creating primary/backup relationships for assigning users to clusters, some of the questions that need to be answered include whether the user will be connected to the primary or backup cluster, a location for storing routing rules for the user, and how changes to the routing rules are to be disseminated to the primary and backup clusters. The challenges with such infrastructures include how to process calls to the user if the primary and/or backup clusters are down, how to process calls to the user when there is network portioning, and how to accomplish these processing tasks without manual intervention.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing user defined routing rules within a primary/backup architecture in an automatic manner without degrading user experience. According to some embodiments, user set-up rules may be stored and published by a designated server to servers on which the user can register including the user's home registrar and any backup registrars. Changes to the rules may be disseminated and synchronized through comparison of versions and exchange of batches between the storing server and registrars.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, routing rules for calls associated with a user may be managed in a primary/backup communication network architecture by having registrars associated with the user submit their replica versions to a presence server storing the routing rules. An exchange of batch versions may follow along with a comparison of the versions at the registrars such that each registrar can determine which batches it needs to be synchronized with the presence server. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems or redundancy systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
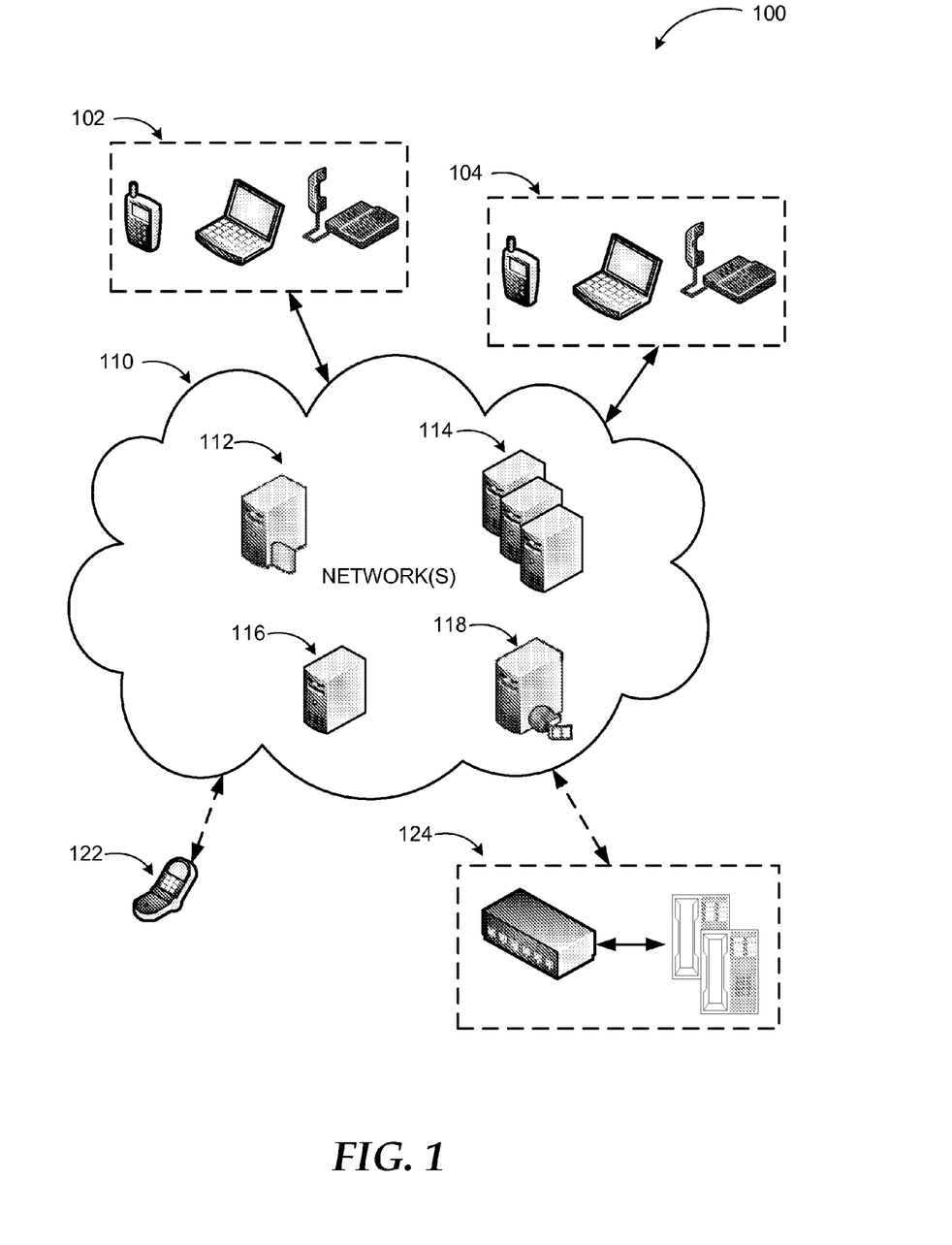
FIG. 1 is a diagram illustrating an example unified communications system, where embodiments may be implemented for managing routing rules defined by a user within a primary/backup cluster architecture.

FIG. 1 includes diagram 100 illustrating an example unified communications system, where embodiments may be implemented for managing routing rules defined by a user within a primary/backup cluster architecture. A unified communication system is an example of modern communication systems with a wide range of capabilities and services that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for multimodal communications. Clients in such a system may be assigned home servers (or registrars) servicing communication requests from users. The home servers may be established as part of primary clusters. A cluster is a group of homogenous servers fronted by a load balancer and visible to the client as a single entity. Each cluster may have one or more backup clusters, each cluster having one or more physical/logic servers. When a communication request is received for a user at any server of the UC system, it may be directed to the primary home server cluster initially. If that cluster is down, a designated backup cluster may be tried next. If the primary and the backup clusters are not available, alternative methods such as routing the request to PSTN may be attempted. Each user may also be assigned to a presence cluster, which stores routing rules set up by the user and publishes the information to registrars that may be used by the user.

While the example system in FIG. 1 has been described with specific components such as mediation server, A/V server, home server, presence server, and similar devices, embodiments are not limited to these components or system configurations and can be implemented with other system configuration employing fewer or additional components. Functionality of systems managing continuous replication in a primary/backup architecture may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
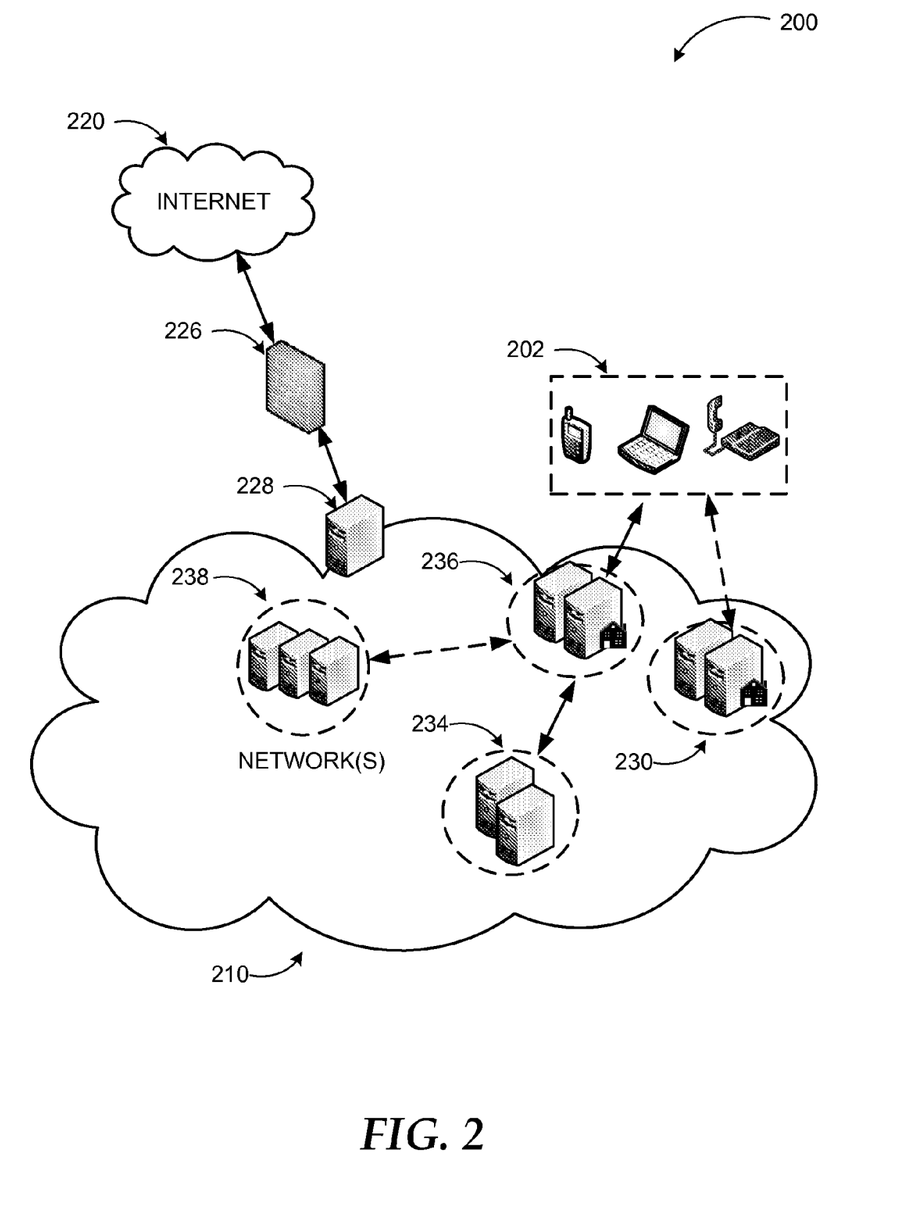
FIG. 2 is a conceptual diagram illustrating example primary and backup server clusters that may manage routing rules for user in an architecture according to embodiments.

FIG. 2 is a conceptual diagram illustrating example primary and backup server clusters that may manage routing rules for user in an architecture according to embodiments. Network 210 in diagram 200 may be a UCN as discussed above. Network 210 may include a number of servers discussed above and facilitate communications for clients 202. Clients 202 represent end point devices (or applications) for users. A user may be associated with more than one end point, zero or more of which may be active at any given time.

Edge server 228 and firewall 226 are an example of a split access server functionality. Firewall 226 provides protection for connections with other networks such as Internet 220, while edge server 228 provides connectivity through the perimeter network. According to some embodiments, one or more edge servers may provide connectivity to clients connected to network 210 with clients through other networks.

As mentioned above, clients 202 may be assigned home server/clusters such as clusters 236 and 230. In a system according to embodiments, a client may connect to the network through their home registrar, but also through other registrars (e.g. if the user moves physically to a different location with their end point and connects to the network). Home clusters may be set up as each other's backups or other servers (e.g. 238) within the network may be configured as backup clusters for one or more home clusters. Furthermore, each home cluster may be associated with a presence server or presence cluster 234. Presence servers may also have backup clusters associated with them.

A request for communication with a particular user may be routed by any server that receives the request to the home server (registrar) of that particular user, which may implement the rules set up by the user in an automatic manner. Thus, a resource can be contacted reliably in a complex system comprising clusters that have backups and that have other non-networking mechanisms configured for contacting a user.

The information of <Home Registrar cluster, Presence Cluster> combination assigned to a user may be made globally available to all clusters in the deployment. The backup configuration information for the home registrar and presence clusters may also be available globally. The routing rules stored in the presence cluster may be made available to any servers with which the user may register. This includes the servers in a particular home registrar cluster of the user and servers in the backup registrar cluster for the user.

Routing rules may include instructions for forwarding calls intended for the user to other recipients when the user is unavailable or does not wish to take calls. The rules may further include time and/or relationship based routing of calls based on a caller type or identity, end point selection (e.g. if the user is on the move, calls may be directed at the user's mobile device instead of their desktop device), and comparable ones. An example of a rule set up by the user is the time limit to ring the user's phone before sending the call to voice mail. For example, if the user sets the timeout to be 20 seconds, then the server waits for 20 seconds for the user to answer the call and then re-directs the call to voicemail. An example of a more complicated rule may involve setting up a supervisor-assistant relationship and processing a call in this context.

The data that is required to route a call to a user following the routing rules set up by the user may be referred to as routing payload. Routing payload may include, but is not limited to, call forwarding rules, privacy relationship settings, hierarchical relationship (e.g. supervisor-assistant) settings, and comparable ones. In a system according to embodiments, the presence cluster may be the master for the routing payload of a user. A user may be allowed to change the routing payload when the presence cluster is available. While scenarios related to changing routing payload when the presence cluster is unavailable may be addressed using the principles described herein, such scenarios involve multi-master distributed systems, which are inherently complex.

In order to process a call for a user, the routing payload for the user needs to be available on the server that is processing the call. A logical approach may be obtaining the routing payload for the user from the presence cluster and employing to process the call. However, challenges for this approach include what the processing server (i.e. home server) is supposed to do if the presence cluster is down at the time of the call; if the server processing the call cannot contact the presence cluster for the user due to network partitioning; and if the presence server was up when the user registered but then went down before the call was processed.

Alternatively, the home server may contact the presence server periodically to get the routing payload for a user and cache it locally. When a call for the user needs to be processed, the home server may use the cached data to complete the call. This alternative approach encounters a roadblock when the user changes the routing payload between periodic queries of the presence server. Any calls received in that period are processed according to older and no longer valid rules.

While the replication processes and systems are described in conjunction with routing rules herein, embodiments are not limited to routing rules. Any user information that is required to handle calls (in any modality including, but not limited to, audio) may be replicated based on the user's preference implementing the principles described here. Furthermore, system structures for implementing embodiments are not limited to single primary-backup architectures. For example, nested backup structures may also be used for synchronizing the backup systems through a single master by continuous replication.

A system according to embodiments enables the routing rules for the user to be in effect immediately after they have been set and to be honored when the health state of servers change. Thus, there are two main phases: connected server replication and offline replication.

Figure 3:
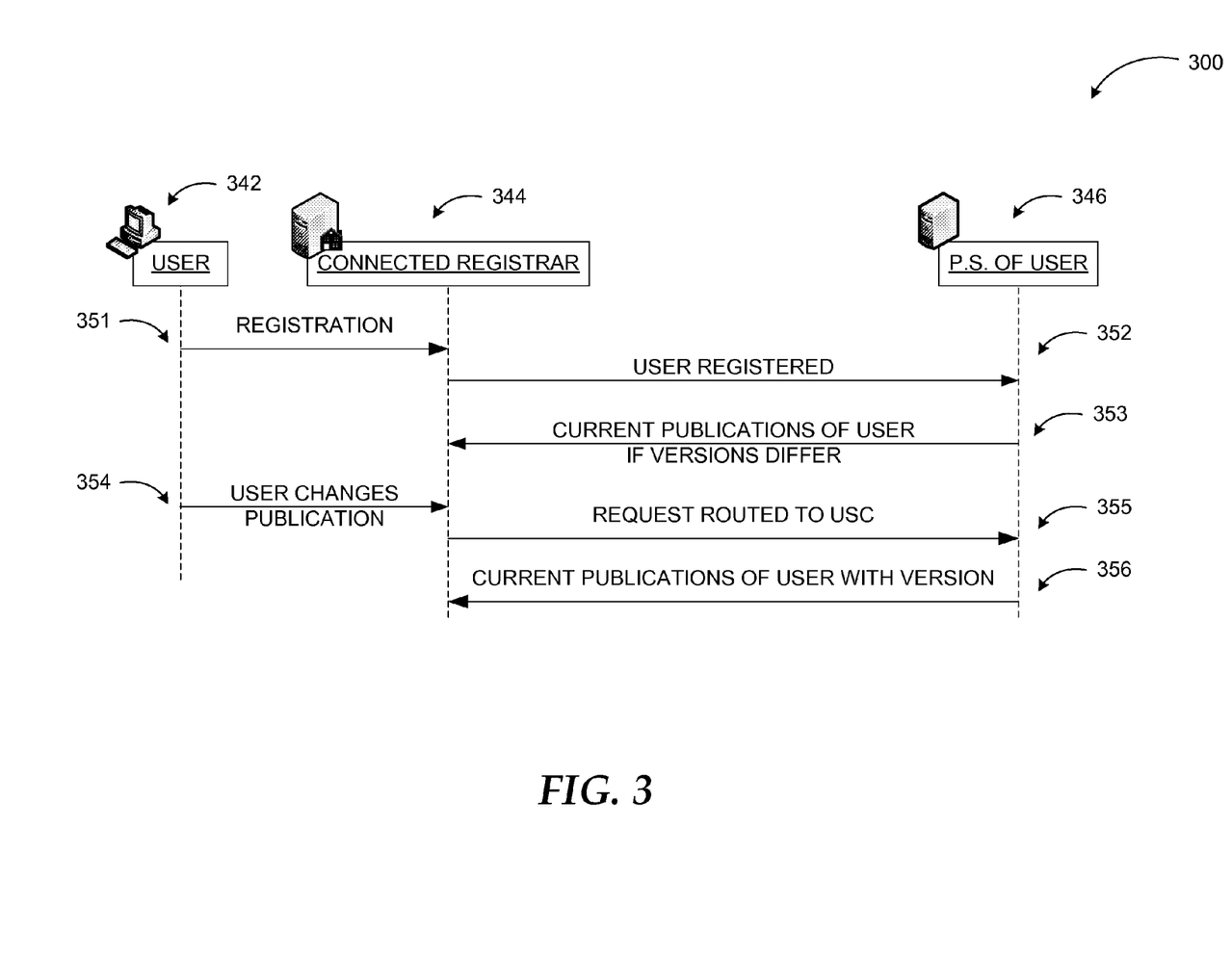
FIG. 3 illustrates example exchanges between a user, his/her registrar, and presence server in a scenario of the user changing published rules after registration.

FIG. 3 illustrates example exchanges between a user, his/her registrar, and presence server in a scenario of the user changing published rules after registration. When a user (e.g. user 342 of diagram 300) registers on a home server (registrar 344), the home server may notify the presence server (346) of the event. This enables the presence server to show the updated presence state for the user (e.g. online, offline, etc). In a system according to embodiments, the notification may also be used to obtain the current routing payload for the user at the time of registration. Use of the registration notification for update ensures the availability of the latest routing payload on the home server with which the user registers if the presence server is up at the time of registration and goes down subsequently.

Similarly, when a user changes their routing payload, the presence server may send a message to the registrar via which the user is connected. In response to this message, the registrar may cache the new payload ensuring that the registrar has the latest information.

Following diagram 300, user 342 registers with connected registrar 344 at exchange 351 followed by the connected registrar 344 notifying presence server 346 of the user at exchange 352. The notification message may include versions of the routing rules at the registrar 344. In response, presence server 346 may compare the received versions to the current ones stored by the presence server and send back current publications (routing rules) of the user at exchange 353 if there is a difference between the versions.

At a later time, user 342 may decide to change one or more of their routing rules and submit the changes to the registrar 344 at exchange 354. Registrar 344 may route the request to change the publications to presence server 346 at exchange 355, which may process/store the changes and send back the current publications (routing rules) of the user with the new versions to registrar 344 at exchange 356.

Figure 4:
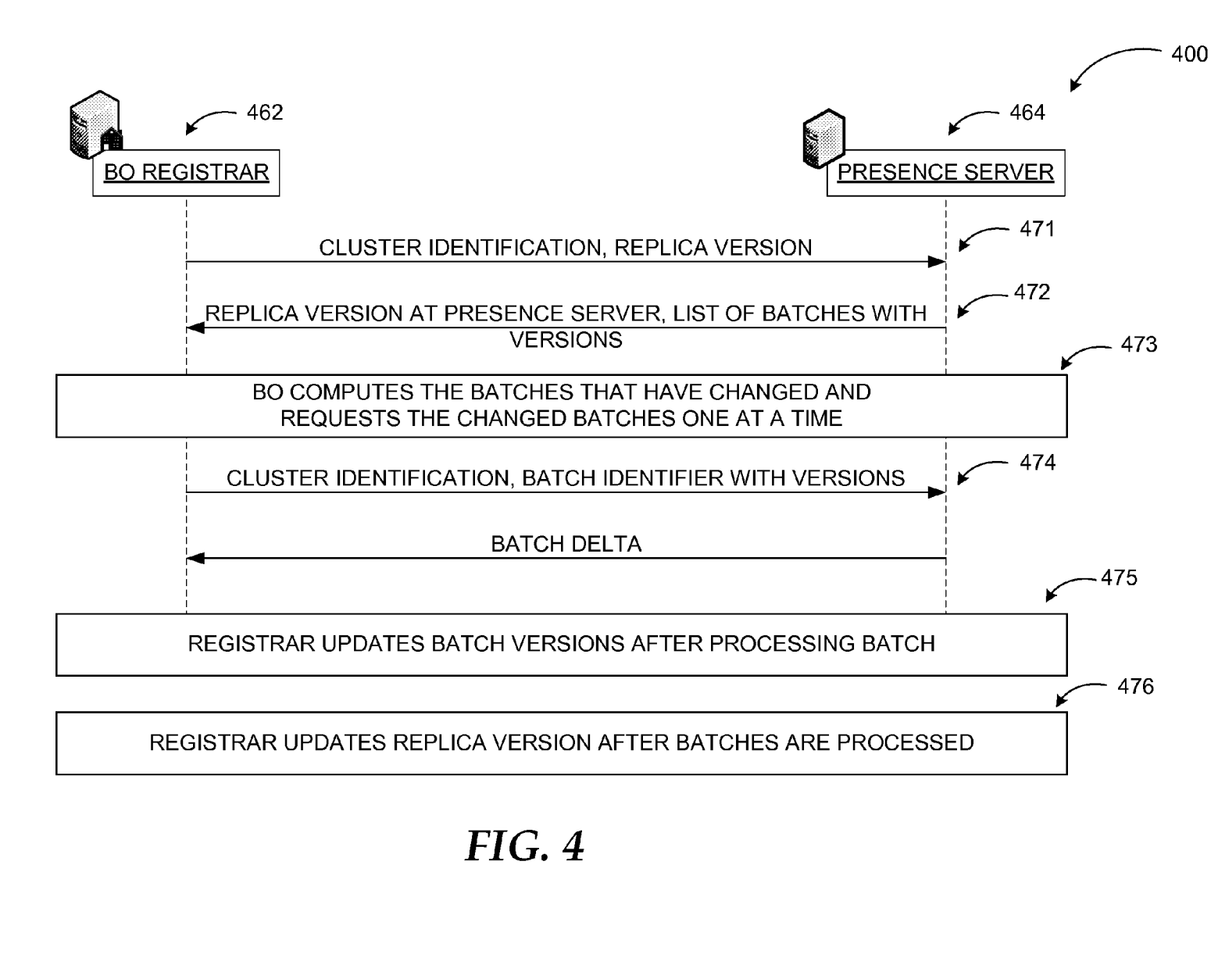
FIG. 4 illustrates example exchanges between a branch office registrar and presence server for updating replication information.

FIG. 4 illustrates example exchanges between a branch office registrar and presence server for updating replication information. As discussed earlier, a user is assigned to a <Registrar Cluster, Presence Cluster>. A registrar cluster is associated with presence server. The registrar cluster may periodically query the presence cluster for changes to the routing payload of users who may potentially connect to it.

For example, if registrar cluster C1 is the backup cluster for registrar cluster C2, then C1 may query its presence server for the routing payload of users who are: (1) assigned to C1 since these users can register with C1 when the presence server is down and their payloads are therefore needed; and (2) assigned to C2 since users on C2 can register on C1 if C2 is down and the presence server can be down at the same time too (thus, their payloads are needed as well). If C1 is not the backup for C2, however, only users who can register on C1 are the users homed on C1. By limiting periodically downloaded routing payload to users homed on a particular registrar, system resources are preserved. Moreover, low end servers provisioned for a few users may not be able to support the routing payload of all the users in the deployment.

According to some embodiments, the presence cluster and the registrar cluster may agree on a common protocol that is designed to minimize the data that is transferred. For example, if the presence server sends back the data about all the applicable users every time, then the data being sent across may remain the same even if no user has changed his routing payload. The protocol may be designed in such a way that the data being transferred is reduced after the initial synchronization between the registrar cluster and the presence cluster. Subsequent synchronizations with the presence cluster may include the changes to user routing payload.

Before addressing the call flow in diagram 400, enhanced communication networks facilitating multi-modal communications (including data exchange) may comprise a number of networks. Some of the services and management processes may be performed centrally (e.g. at information technology headquarters of an enterprise), while other services may be provided in a distributed manner through branch offices. Thus, registrar servers may be classified as branch office (BO) servers or data center (DC) servers. DC servers may communicate directly with each other, while BO servers may employ a standard protocol such as Hypertext Transfer Protocol (HTTP).

Diagram 400 shows an example call flow between a BO registrar 462 and a presence server 464 following a data reducing protocol. Use of batches and versions is an example implementation of maintaining the state on the presence server in order to determine the changes to the data since the last synchronization. Any versioning scheme that accomplishes server state maintenance while reducing exchanged data may be employed using the principles described herein.

Upon registering a user, BO registrar 462 submits its cluster identification (e.g. cluster fully qualified domain name "CFQDN") and a version of its currently stored replica routing payload in a notification message to presence server 464 at exchange 471. The exchange may occur through HTTP since the registrar is BO. In response presence server 464 sends back the replica version of the routing rules stored at the presence server and a list of batches along with their versions at exchange 472. Next, BO registrar 462 may compute any modified batches by comparing the list received from presence server 464 to its versions and begin a process of requesting changed batches one at a time (473). The request exchange(s) 474 may include the cluster identification and a batch identifier along with its version. Presence server 464 responds to the requests by sending batch deltas (475) as described below.

According to some embodiments a major/minor versioning approach may be used. Presence server 464 may compute the items to be sent back using the following scheme. If the major version for a batch matches that received from the replica, presence server may find the modified resources in each batch and consider items that have minor version greater than the minor version of the batch received from registrar as having been modified. If the major version for a batch is greater than that received from the replica, presence server may obtain a list of all users in the batch. Then, presence server may send back the information for each user in the list created through the above steps if a user is homed on the cluster that made the request or the cluster making the request is the backup of the user's primary cluster. Presence server 464 also sends back the major and minor versions.

After receiving each batch delta, BO registrar 462 may update batch versions at the registrar (476) and updating the replica version after all batches are processed (476). This way, the entire routing rule data does not have to be transmitted back and forth between the registrars and their corresponding presence servers. Thus, exchanged data is minimized while keeping the states of the presence servers and their assigned registrars (home servers) synchronized in a reliable manner.

Some of the scenarios, where registrar—presence server synchronization according to embodiments (continuous replication) may be implemented may include: a user logging in and a call for the user arriving on the server on which the user is registered; a user logging in and the presence server going down, where the rule set by the user is still honored; a user logging in to a server which subsequently goes down, and the user logging in to another server in the same cluster; and a user's primary cluster going down and the user registering on the backup cluster when the presence server is down. According to another example scenario, a user may set their call forwarding rules and then go on vacation. At that time, the user not registered on any server in the system, but a call for the user is processed correctly. For example, the user might set a rule indicating that all calls are to be forwarded to his/her cell phone. This rule is honored even when the user's primary cluster is down and the calls are processed by his backup cluster, since the replica at the backup cluster is synchronized with the user's presence server. Further examples of routing rule usage may include the user requesting simultaneous alerts to different end points (e.g. desktop phone, mobile phone, etc.)

Figure 5:
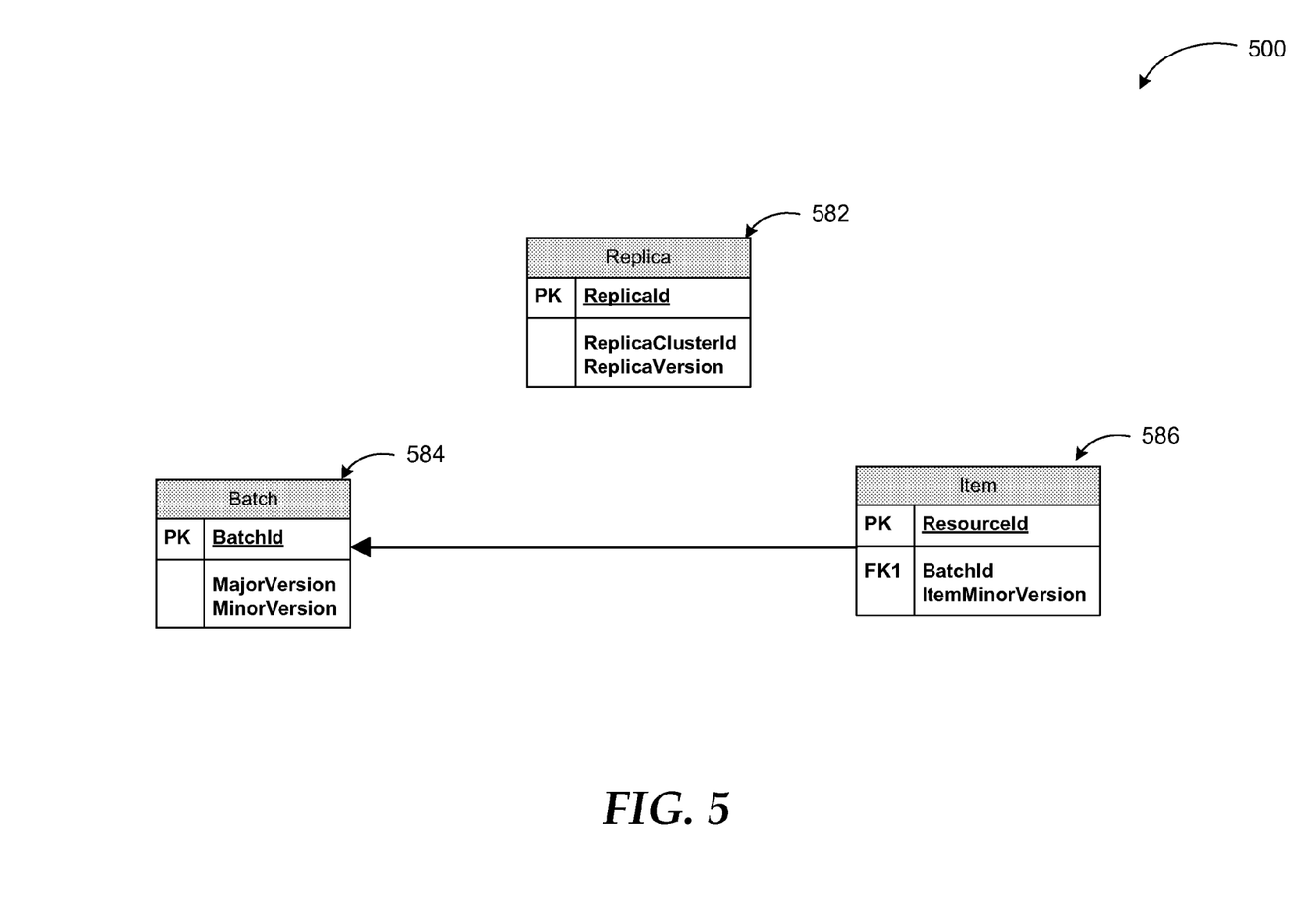
FIG. 5 illustrates example data models in updating changes to user routing rules.

FIG. 5 illustrates example data models in updating changes to user routing rules. As mentioned previously, a dual versioning system employing major and minor versions may be used to keep track of changes to routing rules.

Diagram 500 illustrates example data models in such an architecture. The data models may include a major version and a minor version for each batch 584 identified by a batch identifier. Items 586 may be identified by a resource identifier of the user and include the associated batch identifier and item minor version to indicate a status of each item (relative to the changes made by the user). Replicas 582 may be identified by a replica identifier and include a replica cluster identifier (identifying the cluster to which the replica belongs) and a replica version. A primary key may be used to uniquely identify each row in the data table as shown in diagram 500.

The example systems in FIGS. 3, 4, and 5 have been described with specific components such as presence servers, registrar servers, and similar ones, and particular exchange mechanisms. Embodiments are not limited to communication systems according to these example configurations. An enhanced communication system employing continuous replication according to embodiments may be implemented in configurations employing fewer or additional components and performing other tasks.

Furthermore, embodiments are not limited to enhanced communication systems. Continuous replication through batch versioning may be implemented in other types of networks, where users and/or resources are managed by servers and server groups using the principles described herein.

Figure 6:
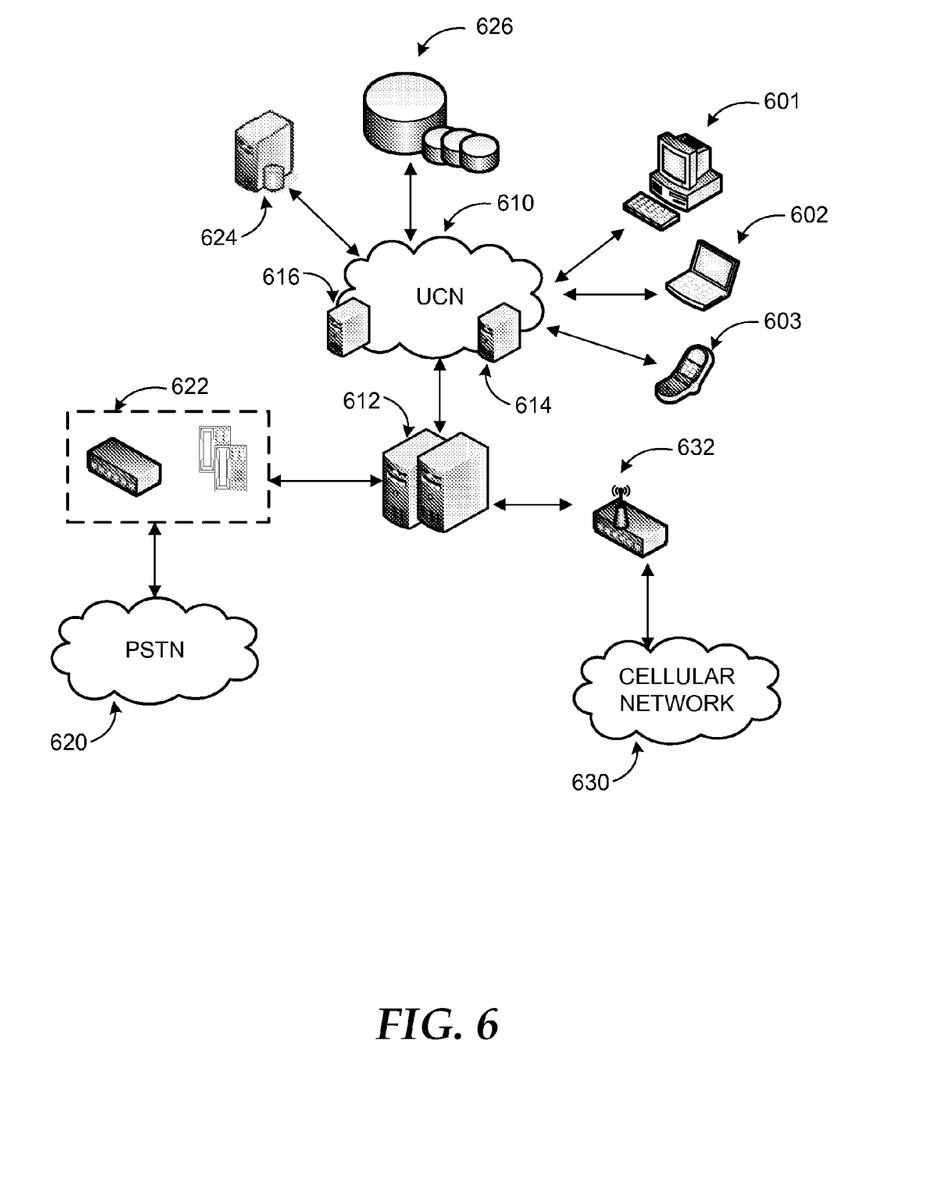
FIG. 6 is a networked environment, where a system according to embodiments may be implemented.

FIG. 6 is an example networked environment, where embodiments may be implemented. A primary/backup cluster architecture employing continuous replication as described previously may be implemented in a distributed manner over a number of physical and virtual clients and servers. Such a system may typically involve one or more networks such as PSTN 620, cellular network 630, and UCN 610. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 612 may provide signaling and media exchange between the different systems. A PBX 622 and an RF modem 632 may be used for connection between the PSTN and the cellular networks, respectively, and the mediation server(s) 612. Client devices 601, 602, 603 communicate with each other and with devices on other networks through UCN 610. The UC system may include a one or more specialized or combination servers for presence, routing, and other functionalities as discussed in more detail above.

Home server(s) 614 may be assigned to client devices 601-603 as primary and/or backup clusters. Presence server(s) 616 may store routing rules for users and provide updated replicas to their assigned home servers according to various approaches described herein. A primary cluster may have one or more backup clusters. Moreover, primary and backup clusters may have reversed roles for each other.

Client devices 601-603 and the servers of the system may communicate through SIP in routing requests through one or more backup clusters. Data associated with the system configuration (e.g. user names, phone numbers, call policies, configuration, records, etc.) and other network related operations may be stored in one or more data stores such as data stores 626, which may be directly accessed by the servers and/or clients of the system or managed through a database server 624. UCN 610 provides the backbone of the UC system and may employ a number of protocols such as SIP, RTP, and the like. Client devices (e.g. 601-603) provide platforms for UCN user end points. Users may access the communication system using a client device or one or more client applications running on a client device.

UCN 610 provides communication between the nodes described herein. By way of example, and not limitation, UCN 610 may include wired media such as a wired network or direct-wired connection, and wireless media such as acoustic, RF, infrared and other wireless media.

Many other configurations of computing devices, applications, data sources, data distribution systems may be employed to implement resilient routing. Furthermore, the networked environments discussed in FIG. 6 are for illustration purposes only. Embodiments are not limited to the example applications, modules, or processes.

Figure 7:
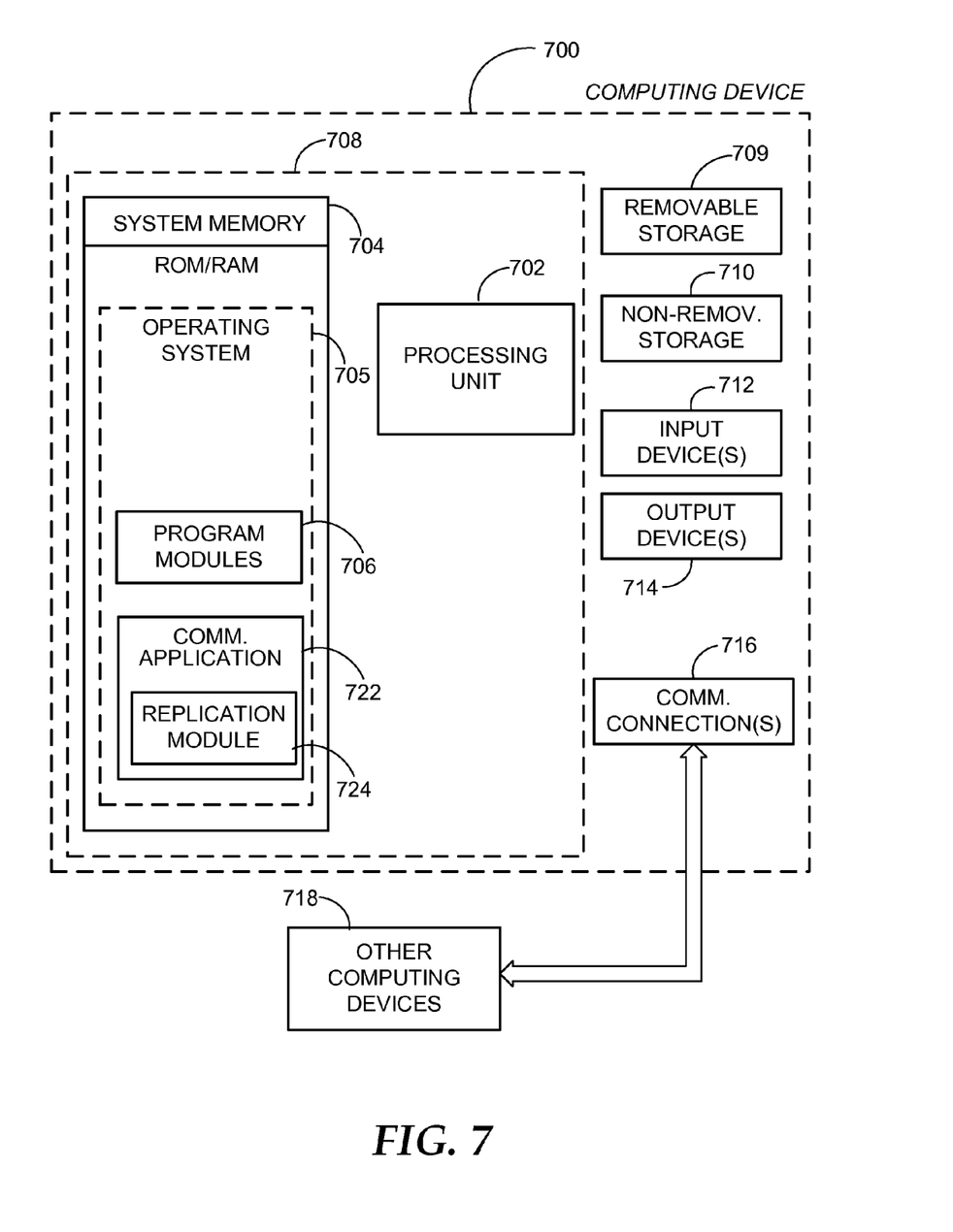
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server managing a communication application or service such as a registrar server (or home server) and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS ® operating systems from MICROSOFT CORPORATION of Redmond, Washington. The system memory 704 may also include one or more software applications such as program modules 706, communication application 722, and replication module 724.

Communication application 722 may be any application that facilitates communication between client applications that connect to computing device 700 and servers relevant to an enhanced communication system such as other home servers, mediation servers, and presence servers. Replication module 724 may maintain a replica of routing rules for users assigned to computing device 700 and update the replica through synchronization with an assigned presence server as described above. Replication module 724 and communication application 722 may be separate applications or integral modules of a hosted service that provides enhanced communication services to client applications/devices. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, presence servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
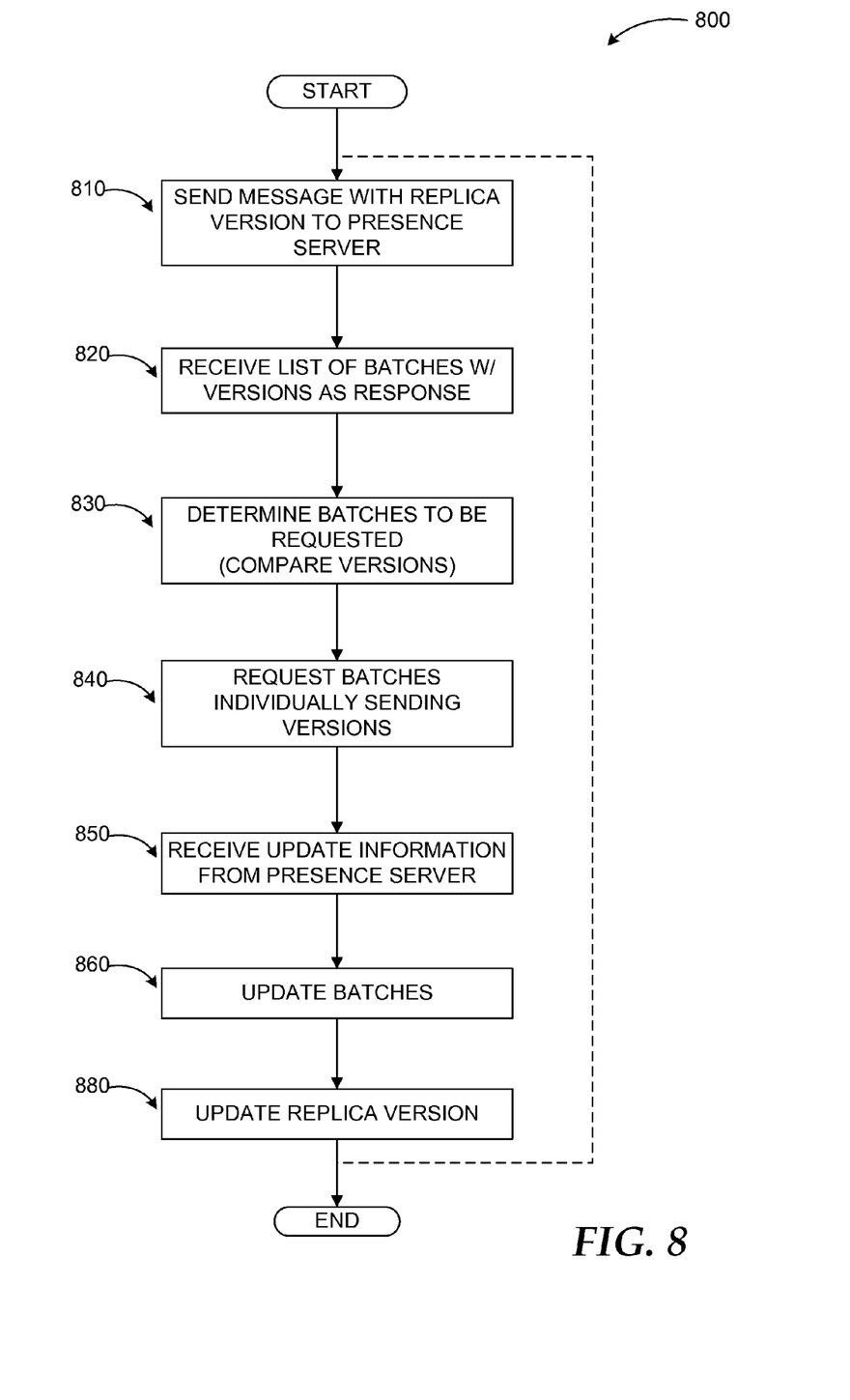
FIG. 8 illustrates a logic flow diagram for a process of updating and disseminating user routing rules in primary/backup cluster architecture according to embodiments.

FIG. 8 illustrates a logic flow diagram for process 800 of updating and disseminating user routing rules in primary/backup cluster architecture according to embodiments. Process 800 may be implemented as part of an enhanced communication system on a home server.

Process 800 begins with operation 810, where upon detecting a login of a user, the assigned registrar sends a notification message to its assigned presence server. The notification message may include a version of the replica routing rules at the registrar. At operation 820, the registrar may receive a list of batches with their versions from the presence server after the presence server computes the list of batches for the user. At operation 830, the registrar may determine batches to be requested from the presence server based on comparing the versions returned by the presence server to the versions known to the registrar.

Subsequently, the registrar may request the batches with different versions individually from the presence server by submitting batch identifiers and versions at operation 840. At following operation 850, updates to the requested batches may be received from the presence server and the batches updated at the registrar along with their versions at operation 860. Once all batches are updated, the registrar may update its replica version reflecting the latest synchronization with its assigned presence server at operation 870.

The operations included in process 800 are for illustration purposes. Continuous replication for SIP based communication systems according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing continuous replication of routing rules, the method comprising:
    detecting an agreement between a processor of a presence server and a processor of a registrar server on a common protocol designed to minimize data transfer;
    upon detecting a user log-in at the processor of the registrar server, providing the processor of the presence server with a version of a current routing rules replica stored at data storage of the registrar server;
    receiving a list of routing rules and current versions of the routing rules from the processor of the presence server, wherein the list of routing rules and current versions of the routing rules are comprised of batches;
    determining out-of-date routing rules at the processor of the registrar server;
    requesting updates for the out-of date routing rules from the processor of the presence server; wherein the request includes a registrar cluster identification, a batch identifier, and a batch version, each batch version including a major version and a minor version;
    employing a major/minor versioning scheme to compute batch deltas in order to provide update information, wherein:
        in response to determination that a major version for a batch matches a major version of a batch received from a processor of the registrar server, modified resources are determined in each batch based on a comparison of minor versions of received and stored batches at a processor of the presence server to compute the batch deltas; and
        in response to determination that the major version for a batch does not match the major version of a batch received from the processor of the registrar server, a list of users associated with the batch is obtained, and information is sent back for each user in the list that is assigned to the processor of the registrar server;
    receiving the update information associated with the out-of-date routing rules at the processor of the registrar server; and
    updating the routing rules stored at the processor of the registrar server and versions of the updated routing rules.

2. The method of claim 1, further comprising:
    updating the version of the replica of routing rules stored at the registrar upon completion of the update of routing rules.

3. The method of claim 1, further comprising:
    upon receiving a routing rule change from the logged in user, routing the change as a request to the processor of the presence server; and
    receiving updated routing rule from the processor of the presence server for storing at the processor of the registrar.

4. The method of claim 3, wherein the user is enabled to change the routing rule if the processor of the presence server is available, wherein calls directed at the user are processed according to routing rules currently stored at the processor of the registrar server if the processor of the presence server is unavailable.

5. The method of claim 1, wherein the registrar is one of: a home server for the user and a backup server assigned to the home server for the user.

6. The method of claim 1, wherein the routing rules are stored as part of a routing payload, the routing payload comprising at least one from a set of: the routing rules, a privacy relationship setting, and a hierarchical relationship setting.

7. The method of claim 1, further comprising:
    periodically querying the processor of the presence server for changes to the routing payload associated with users assigned to the registrar.

8. The method of claim 1, further comprising:
employing versioned batches to exchange update information about out-of-date routing rules.

9. The method of claim 1, wherein the registrar server and the presence server are part of clusters.

10. The method of claim 1, wherein the processor of the registrar server and the processor of the presence server exchange messages via Session Initiation Protocol (SIP).

11. A computing device for providing continuous replication of routing rules, the computing device comprising:
a processing unit;
a memory; and
the processing unit coupled to the memory, the processing unit executing a communication application, wherein the communication application is configured to:
detect an agreement between a presence server and a registrar server on a common protocol designed to minimize data transfer;
upon detecting a user log-in, notify the presence server with a version of a current routing rules replica stored at the registrar server using the protocol to reduce the data transfer between the presence server after an initial notification;
determine out-of-date routing rules based on a comparison of versions of a list of routing rules received from a presence cluster assigned to a registrar cluster, wherein the versions of the list of routing rules comprise versioned batches that are compared to exchange update information about the out-of-date routing rules;
request updates for the out-of date routing rules from the presence cluster, wherein the request includes a registrar cluster identification, a batch identifier, and a batch version, each batch version including a major version and a minor version;
employ a major/minor versioning scheme at the presence cluster to compute batch deltas, wherein:
in response to determination that a major version for a batch matches a major version of a batch received from a processor of the registrar server, modified resources are determined in each batch based on a comparison of minor versions of received and stored batches at a processor of the presence server to compute the batch deltas; and
in response to determination that the major version for a batch does not match the major version of a batch received from the processor of the registrar server, obtain a list of users associated with the batch, and send back the information for each user in the list that is assigned to the processor of the registrar server;
provide the batch deltas to the registrar cluster;
update the routing rules stored at the registrar cluster and versions of the updated routing rules based on the batch deltas received from the presence cluster; and
in response to the notification from the registrar cluster, send a current replica version and a current list of routing rules to the registrar cluster;
determine update information for each out-of-date routing rule based on the update requests from the registrar cluster;
provide the update information to the registrar cluster; and
update the current replica version.

12. The computing device of claim 11, wherein the communication application is further configured to:
assign at least one backup cluster to the registrar cluster and assign a backup cluster to the presence cluster, wherein the registrar cluster/presence cluster combination assigned to a user and a backup configuration for the clusters is published globally within the system such that the user is enabled to connect to the system through a registrar cluster other than the assigned registrar cluster.

13. The computing device of claim 11, wherein the communication application is further configured to:
provide the entire routing rules to the registrar cluster during an initial synchronization and provide updates to changed rule during subsequent synchronizations such that a state of the presence cluster is maintained at the registrar cluster assigned to the user.

14. The computing device of claim 11, wherein the routing rules include at least one from a set of: a time based rule, a relationship based rule, a caller based rule, and an end point selection rule for routing calls associated with the user.

15. The computing device of claim 11, wherein the registrar cluster is one of: a branch office cluster configured to exchange messages with the presence cluster through Hypertext Transfer Protocol (HTTP) and a data center cluster configured to exchange messages with the presence cluster via direct call.

16. A computer-readable memory device with instructions stored thereon for providing continuous replication of routing rules, the instructions comprising:
detecting an agreement between processors of a presence cluster and processors a registrar cluster on a common protocol designed to minimize data transfer;
periodically querying the processors of the presence cluster for changes to a routing payload comprising at least one from a set of: routing rules, a privacy relationship setting, and a hierarchical relationship setting associated with users assigned to the processors of the registrar cluster;
upon detecting a user log-in at the registrar cluster, notifying the processors of the presence cluster with a version of a current routing rules replica stored at the processors of the registrar cluster;
receiving a list of the routing rules and current versions of the routing rules from the processors of the presence cluster;
determining out-of-date routing rules by comparing the received versions to versions of the routing rules cached at the processors of the registrar cluster, wherein versions of the routing rules are comprised of versioned batches;
requesting individual updates for the out-of date routing rules from the processors of the presence cluster, wherein the request includes a registrar cluster identification, a batch identifier, and a batch version, each batch version including a major version and a minor version;
employing a major/minor versioning scheme at the processors of the presence cluster to compute batch deltas, wherein:
in response to determination that a major version for a batch matches a major version of a batch received from a processor of the registrar cluster, modified resources are determined in each batch based on a comparison of minor versions of received and stored batches at a processor of the presence cluster to compute the batch deltas; and
in response to determination that the major version for a batch does not match the major version of a batch received from the processor of the cluster, obtain a list of users associated with the batch, and send back information for each user in the list that is assigned to the processor of the registrar cluster;

receiving update information associated with the out-of-date routing rules at the processors of the registrar cluster from the batch deltas provided by the processors of the presence cluster;

updating the routing rules and versions of the routing rules cached at the processors of the registrar cluster; and updating the version of the current routing rules replica at the processors of the registrar cluster.

17. The computer-readable memory device of claim 16, wherein the instructions further comprise:

if the registrar cluster becomes unavailable, enabling user access through another registrar cluster and implement the routing rules stored at the presence cluster by providing the routing payload to processors of the other registrar cluster.

18. The computer-readable memory device of claim 16, wherein the instructions further comprise:

enforcing the routing rules even if the user if logged out and the processors of the presence cluster is unavailable.

19. The computer-readable memory device of claim 16, wherein the routing rules are implemented for multi-modal calls associated with the user comprising at least one from a set of: an audio communication, a video communication, an email exchange, a text message exchange, a data sharing session, a whiteboard sharing session, and an application sharing session.

* * * * *